(12) United States Patent
Subramanian et al.

(10) Patent No.: US 11,238,172 B2
(45) Date of Patent: Feb. 1, 2022

(54) MANAGING USER ACCESS TO DATA OF A SOCIAL MEDIA ACCOUNT

(71) Applicant: INTERNATIONAL BUSINESS MACHINES CORPORATION, Armonk, NY (US)

(72) Inventors: Aparna Subramanian, Plano, TX (US); Shishir Saha, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 16/449,972

(22) Filed: Jun. 24, 2019

(65) Prior Publication Data
US 2020/0401709 A1    Dec. 24, 2020

(51) Int. Cl.
*G06F 21/62*    (2013.01)
*H04L 29/06*    (2006.01)

(52) U.S. Cl.
CPC .............. *G06F 21/62* (2013.01); *H04L 63/10* (2013.01)

(58) Field of Classification Search
CPC ................................. G06F 21/62; H04L 63/10
See application file for complete search history.

(56) References Cited

U.S. PATENT DOCUMENTS

| 9,282,090 | B2 | 3/2016 | Liberman et al. |
| 9,553,888 | B2 | 1/2017 | Stiansen et al. |
| 2002/0174134 | A1 | 11/2002 | Goykhman |
| 2009/0222894 | A1* | 9/2009 | Kenny ..................... G06F 21/33 726/4 |
| 2011/0288934 | A1 | 11/2011 | Douceur et al. |
| 2012/0151046 | A1 | 6/2012 | Weiss et al. |
| 2012/0151047 | A1 | 6/2012 | Hodges et al. |
| 2012/0291140 | A1* | 11/2012 | Robert ................. H04N 21/835 726/28 |
| 2013/0067600 | A1* | 3/2013 | Graham ................ G06F 21/335 726/30 |
| 2015/0106947 | A1* | 4/2015 | Holman .................. G06F 21/62 726/26 |
| 2015/0180746 | A1 | 6/2015 | Day, II et al. |
| 2018/0089449 | A1* | 3/2018 | Boudreau ........... H04L 63/0428 |
| 2018/0191759 | A1* | 7/2018 | Baijal ................. H04L 63/1425 |
| 2019/0057204 | A1* | 2/2019 | Marcovecchio .... H04L 63/1433 |
| 2019/0087578 | A1* | 3/2019 | Govindarajan ........ G06F 21/602 |
| 2019/0163931 | A1* | 5/2019 | Wolverton .............. G06F 3/067 |
| 2020/0401709 | A1* | 12/2020 | Subramanian .......... H04L 63/10 |

FOREIGN PATENT DOCUMENTS

| AU | 2016200701 A1 | 8/2016 |
| WO | 2018116124 A1 | 6/2018 |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Yonas A Bayou
(74) *Attorney, Agent, or Firm* — Teddi E. Maranzano

(57) ABSTRACT

Managing user access to data of a social media account, by providing a first user with access to data of a social media account of a second user based on determining that a first data access request by the first user conforms to an expected data access pattern.

17 Claims, 6 Drawing Sheets

MANAGING USER ACCESS TO DATA OF A SOCIAL MEDIA ACCOUNT

BACKGROUND

Embodiments of the invention generally relate to electronic social media platforms and more particularly to managing user access to social media data.

Social media platforms generally allow their users to create, view, and share digital content with other users. Users typically have the option to create accounts that have associated profiles, and to connect to other users' accounts; for example, by sending or receiving "friend" or "connection" requests. Security and privacy features provide users some control over how others view or share the users' content, or how others communicate with the users. However, these functions are limited and have drawbacks.

SUMMARY

Embodiments of the invention provide for methods, computer program products, and systems for managing user access to data of a social media account, by providing a first user with access to data of a social media account of a second user based on determining that a first data access request by the first user conforms to an expected data access pattern.

An embodiment of the invention denies the first user access to data of the social media account of the second user based on determining that a second data access request by the first user deviates from the expected data access pattern.

An embodiment of the invention determines that the first data access request by the first user conforms to an expected data access pattern based on analyzing any one or combination of:

a historical data access pattern of the first user to data of the social media account of the second user; and a historical data access pattern of the first user to data of a social media account of a third user.

In an embodiment of the invention, an expected data pattern is defined based at least on relationship data of the first user with the second user.

In an embodiment of the invention, an expected data pattern is defined based on privacy settings of the social media account of the second user relative to a plurality of additional users.

In an embodiment of the invention, an expected data pattern is defined based at least on a length of time of past data accesses by the first user to data of the social media account of the second user.

In an embodiment of the invention, an expected data pattern is defined based at least on a frequency of past data accesses by the first user to data of the social media account of the second user.

In an embodiment of the invention, an expected data pattern is defined based at least on an access pattern for a third user to data of the social media account of the second user.

In an embodiment of the invention, an expected data pattern is defined based at least on an access pattern for the first user to data of a social media account of a third user.

In an embodiment of the invention, providing a first user with access to data of a social media account of a second user based on determining that a first data access request by the first user conforms to an expected data access pattern, comprises:

limiting access by the first user to the data of the social media account of the second user for a period of time.

In an embodiment of the invention, providing a first user with access to data of a social media account of a second user based on determining that a first data access request by the first user conforms to an expected data access pattern, comprises:

alerting the second user of the access request by the first user to the data of the social media account of the second user.

DETAILED DESCRIPTION

A limitation of the prior art is that users often must make binary choices about others' access to their information. The users' profiles or their shared content must be either public or private. Another user's connection request must be either accepted or rejected. Changing the consequences of each binary selection requires manual intervention; existing connections must be manually removed, and the content's sharing category must be changed. Even where a social media platform provides intermediary options (for example, allowing for content to be shared with select users, a group, an entire network, or publicly), the consequences are immutable without manual intervention.

A consequence of this fundamental design of social media platforms is that it allows for negative and undesirable social behaviors such as cyber bullying or cyberstalking, where a requesting user may engage with a target user in an unwanted and harmful manner; potentially without the target user's awareness. For example, in the case of cyberbullying, the requesting user may communicate profane or derogatory messages directly to the target user or in a forum that includes the target user. As another example, in the case of cyberstalking, the requesting user may engage in a data access pattern that the target user, if aware, would find undesirable or inappropriate.

The nature of these engagements can change over time. For example, the engagements may even be positive, or at least neutral, at some point. However, as the nature of the engagements change and become negative, preventing them requires both the target user's awareness and manual intervention.

There is therefore a need for improved manners of managing user access to data of a social media account.

Figure 1:
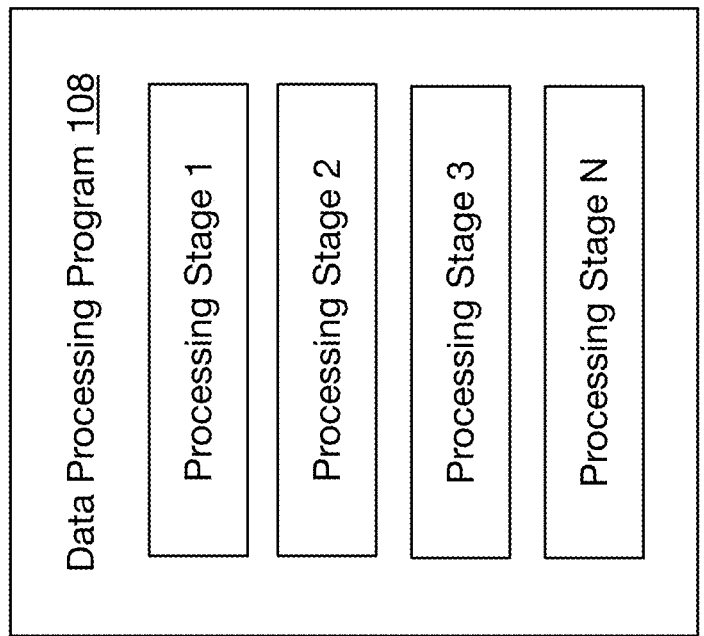
FIG. 1 is a functional block diagram of a social media platform environment, according to an embodiment of the invention.
Figure 1:
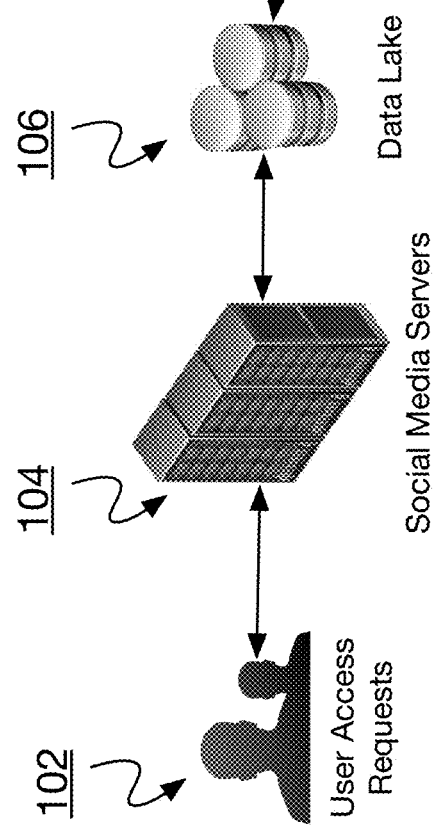
Figure 2A:
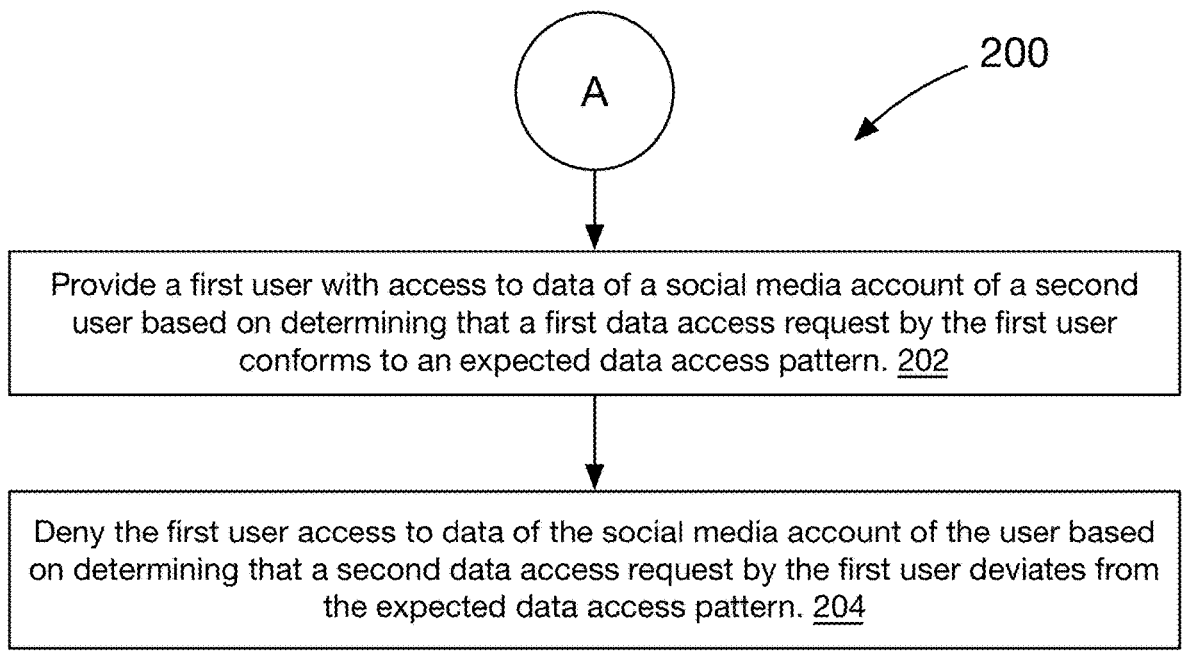
FIGS. 2A, 2B, and 2C are flow diagrams of steps of a method for managing user access to data of a social media account, according to embodiments of the invention.
Figure 2B:
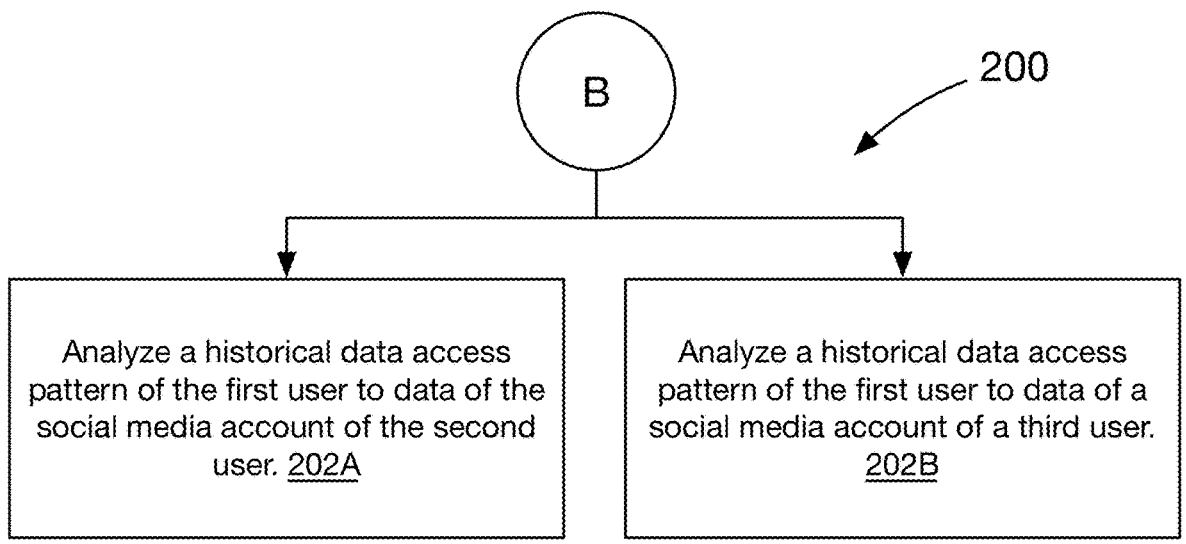
Figure 2C:
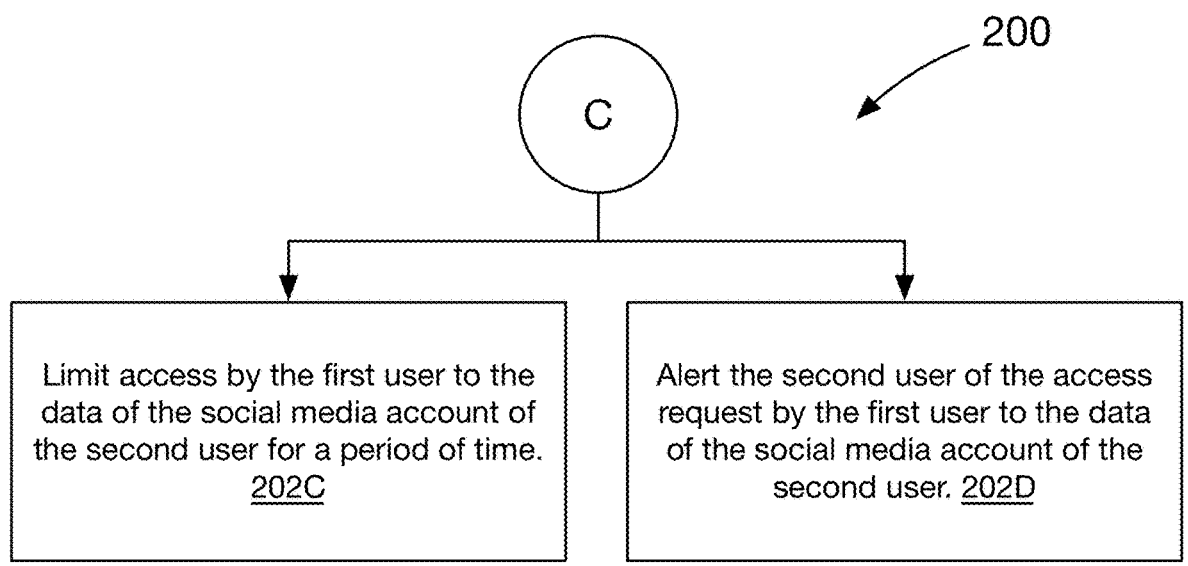

Embodiments of the invention will now be described in connection with the Figures. FIG. 1 is a functional block diagram of a social media platform environment, according to an embodiment of the invention. FIGS. 2A, 2B, and 2C are flow diagrams of steps of a method for managing user access to data of a social media account, according to embodiments of the invention.

Referring now to FIG. 1, social media platform environment 100 generally includes user access requests 102 made to one or more social media servers 104 for access to data in data lake 106. Social media servers generally provide access to data in data lake 106 based on results of a data processing program 108 having one or more processing stages, such as processing stages 1-N. In an embodiment, social media servers 104, data lake 106, and data processing program 108 define, or are parts of, a social media platform (not labeled). The social media platform may be a functional entity embodied on one or more computing devices by executing programming code and by processing electronic data. The social media platform may have one or more users each of whom may have social accounts.

Social media servers 104 generally are computing nodes, for example as defined in connection with FIG. 3, below. Social media servers host social media data of one or more social media users. The social media data may be logically organized into user accounts having associated profile data and content data. Profile data may include information about a user, such as user demographics and other identifying information. Content data may include any information that the user uploads to or creates on the social media platform (for example, textual or graphical posts, videos, audio files, music, or hyperlinked content, tags, or messages to other users), or information that is communicated to or linked to the user by others (similar to information that the user may upload or create on the social media platform).

Social media servers 104 receive user access requests for social media data. For example, social media servers 104 may receive a user access request 102 from a first user of the social media platform for data of a social media account of a second user. Throughout the discussion of embodiments of the invention and related examples, where the request for access by the first is unwelcome, or would be unwelcome if the second user were to become aware of it, the first user may be referred to as a requesting user and the second user may be referred to as a target user.

In an embodiment, the requests for access may also include a request to connect with the target user.

Social media servers 104 may operate on social media data stored in data lake 106. Data lake 106 may be a repository of social media data embodied as a collection of tangible data storage devices.

Social media servers 104 may perform operations on social media data in data lake 106 by executing, using one or more processors, programming instructions of a computer program, such as data processing program 108. Programming instructions of data processing program 108 may be organized into logical or actual classes, methods, routines, phases, or stages, to accomplish one or more desired results. In the depicted example, these instructions may enable processing stages 1-N. These processing stages generally may perform data analytics, data normalization, and data access determination, as described in connection with embodiments of the invention.

Referring now to FIGS. 2A-C, steps of a computer-implemented method 200 for managing user access to data of a social media account are provided. The steps may be performed by executing one or more programming instructions of data processing program 108.

Referring now to FIGS. 1 and 2A-C, social media servers 104 implement method 200 according to flow A, and provide (step 202) a first user with access to data of a social media account of a second user based on determining that a first data access request by the first user conforms to an expected data access pattern. The first and second users may be users of the social media platform. The first user may have default or pre-determined access privileges to the data of the social media account of the second user. For example, the first and second users may be connected on the social media platform; or the second user may generally have access to data of the social media account of the second user, and/or to particular information shared on the second user's account.

Social media servers 104 may deny (step 204) the first user access to data of the social media account of the second user based on determining that a second data access request by the first user deviates from the expected data access pattern.

In one embodiment, determining (step 202) that the first data access request by the first user conforms to an expected data access pattern is performed according to process flow B (FIG. 2B) and is based on any one or combination of analyzing (step 202A) a historical data access pattern of the first user to data of the social media account of the second user, and a analyzing (step 202B) historical data access pattern of the first user to data of a social media account of a third user.

For example, social media servers 104 may determine a base-line access pattern by the first user to content shared on the social media account of the second user (for example, shared photos) during a three-month period. If the first user's access pattern changes by more than a threshold value, social media servers 104 may take action to control (for example, reduce, delay, or otherwise moderate) the first's user's access. This may be desirable where, for example, where the access pattern exhibits obsessive behavior that, if known to the second user, would be undesirable or unwelcome.

In an embodiment, the expected data pattern is defined based at least on relationship data of the first user with the second user. For example, an access pattern may be acceptable when it is between two users that already are connected, or whose connection is strong; whereas the same access pattern by two users who are not connected or not as closely connected may be undesirable by the second user. Some examples of relationship data include: connected or not connected; level of connection or degree of separation (for example, friend-of-a-friend or $3^{rd}$ level connection); and follower/not follow.

In an embodiment, an expected data pattern is defined based on privacy settings of the social media account of the second user relative to a plurality of additional users. For example, the more stringent the privacy settings on the second user's profile or shared content, the more sensitive the detection deviation from the baseline access pattern may be.

In an embodiment, an expected data pattern is defined based at least on a length of time of past data accesses by the first user to data of the social media account of the second user. For example, the first user's access pattern may be monitored during a first month to determine the length of each access; this may be referred to as an access session. Thereafter, if the access pattern increases by more than a threshold value in a second month, social media servers 104 may moderate that access. For example, if the first user's typical access session lasts 5 minutes, but thereafter becomes significantly longer (by more than a threshold value), social media servers 104 may moderate that access.

In an embodiment, an expected data pattern is defined based at least on a frequency of past data accesses by the first user to data of the social media account of the second user. For example, the first user's access pattern may be monitored during a first month to determine how often the first user accesses data of the social media account of the second user. Thereafter, if the number of accesses increases by more than a threshold value in a second month, social media servers 104 may moderate that access.

In an embodiment, an expected data pattern is defined based at least on an access pattern for a third user to data of the social media account of the second user. For example, if the first user's access is in line with how other users are accessing the second user's social media account data, this access may be appropriate. In this example, although the first user's access is increasing, it is not atypical, and it may not be undesirable.

In an embodiment, an expected data pattern is defined based at least on an access pattern for the first user to data of a social media account of a third user. For example, if the first user exhibits the same access pattern across social media accounts, the access pattern is not unusual for that user and may not be unwelcome by the second user.

In an embodiment, providing (step 202) a first user with access to data of a social media account of a second user based on determining that a first data access request by the first user conforms to an expected data access pattern, is performed according to process flow C (FIG. 2C), and may be implemented by limiting (step 202C) access by the first user to the data of the social media account of the second user for a period of time. In an embodiment, providing (step 202) a first user with access to data of a social media account of a second user based on determining that a first data access request by the first user conforms to an expected data access pattern, may be implemented by alerting (step 202D) the second user of the access request by the first user to the data of the social media account of the second user.

Referring now generally to FIGS. 1 and 2A-C, social media servers 104 may collect and analyze the following non-limiting and exemplary data in performing one or more of the functions enumerated: type of data requested/accessed by the accessing user (e.g., media files shared by the target user; text authored by the target user); duration of data access by the accessing user; frequency of data accessed (e.g., accessing the same data multiple times); time-of-day for maximum data access (e.g., unpredictable or uncommon times; for example, uncommon relative to other users); known or inferred relationship between the accessing user and the target user (e.g., social media servers 104 may determine that the accessing user and the target user belong to the same organization or group, such as a same school; live in the same neighborhood; have similar interests; have friends in common; are tagged in the same photo); past interactions between the accessing user and the target user (e.g., a one accessing user may also have mutually communicated with the target user, whereas another accessing user may not have had any mutual communication with the target user; the latter's communications may be moderated because it may indicate that the access is unwelcome, or would be unwelcome if known to the target user); and public vs. private setting of the target user's social media account.

In an embodiment, social media servers 104 may generate data matrices based on the collected information for various users to determine baseline/expected access patterns for various conditions (for example, for various times of day, month, or year; or during particular events or conditions). For example, increased access levels to a target user's account during a public event where the target user is listed as a host may be an expected access pattern, whereas the same access pattern may be unexpected at another time under different circumstances. The matrices can be changed and new categories added based on changing trends in data access and sharing on the social media platform.

In an embodiment, social media servers 104 may develop expected or baseline data access patterns by weighing observed accesses differently. For example, an expected access pattern to a social media account of a target user who is a public figure may impact the resultant data models differently than access patterns to a social media account of another target user who is not a public figure. In an embodiment, repeated access requests by the same accessing user to the same target user's data may be weighed more highly than other data accesses.

With continued reference to FIG. 1, social media servers 104 may generated one or more data models for expected or baseline data access patterns, during a training phase using training data. In one example, a control group may be analyzed (alpha phase), and thereafter a larger group may be analyzed (beta phase).

In an embodiment, data collection processes used to log the accessing user's data access requests may be executed on the accessing user's device, the target user's device, social media servers 104, or an intermediary computing device (for example, by an Internet service provide (ISP) or another third party service provider).

determine that an accessing user's access pattern deviates from an expected access pattern by more than a threshold value; for example, the accessing user may access the target user's social media data x times during y hours. The threshold value may be predetermined, dynamic (automatically determined), and/or manually adjusted.

Figure 3:
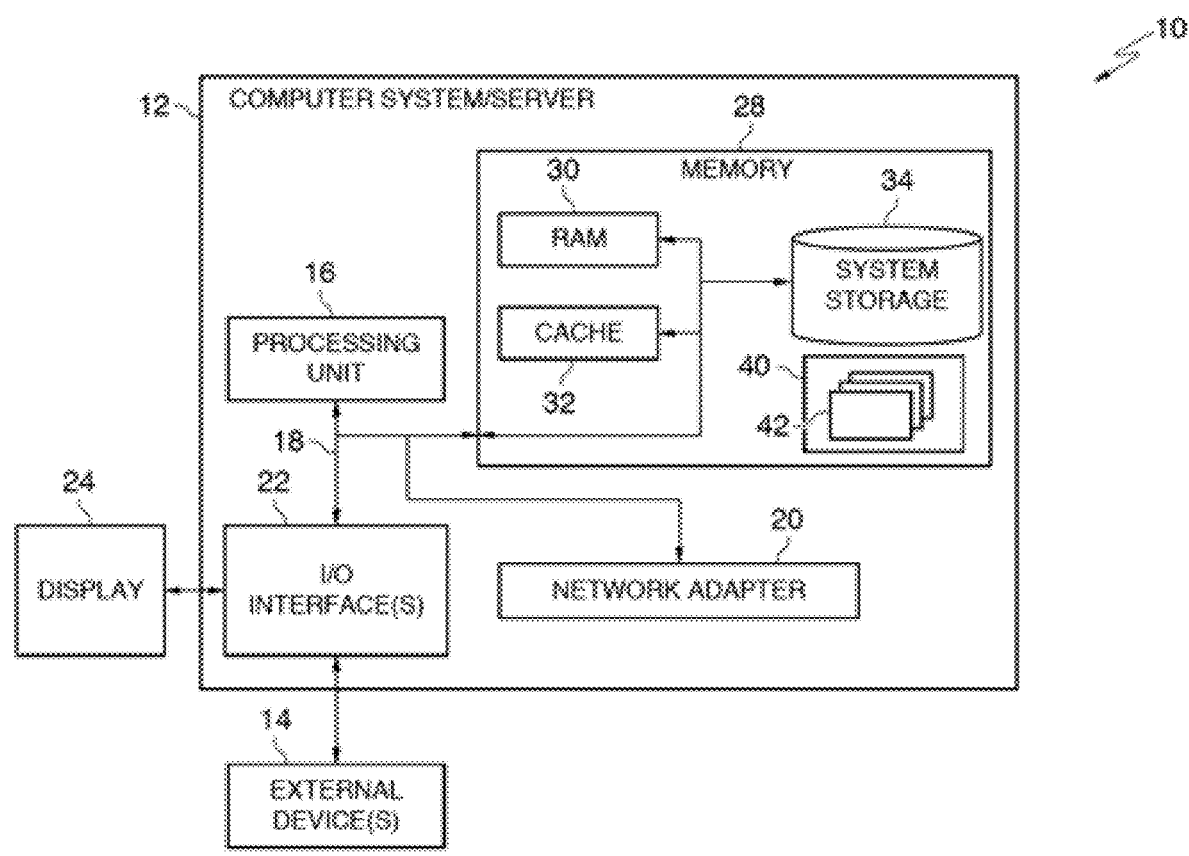
FIG. 3 is a block diagram of an illustrative cloud computing node, according to an embodiment of the invention.

FIG. 3 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove (for example, in connection with FIGS. 1, 2A, 2B, and 2C, above).

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
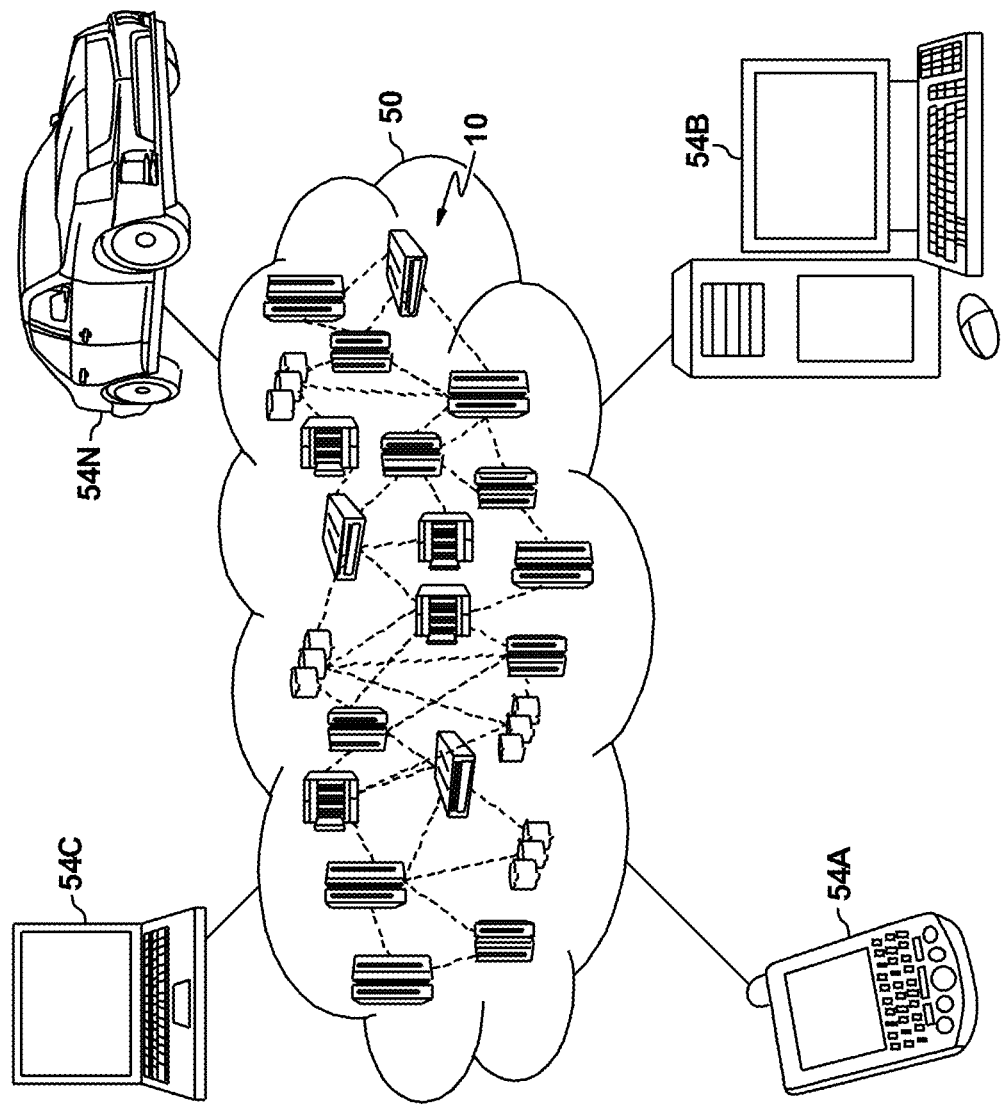
FIG. 4 is a block diagram of a cloud computing environment including the cloud computing node of FIG. 3, according to an embodiment of the invention.

FIG. 4 is a block diagram of a cloud computing environment including the cloud computing node of FIG. 3, according to an embodiment of the invention. Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 5:
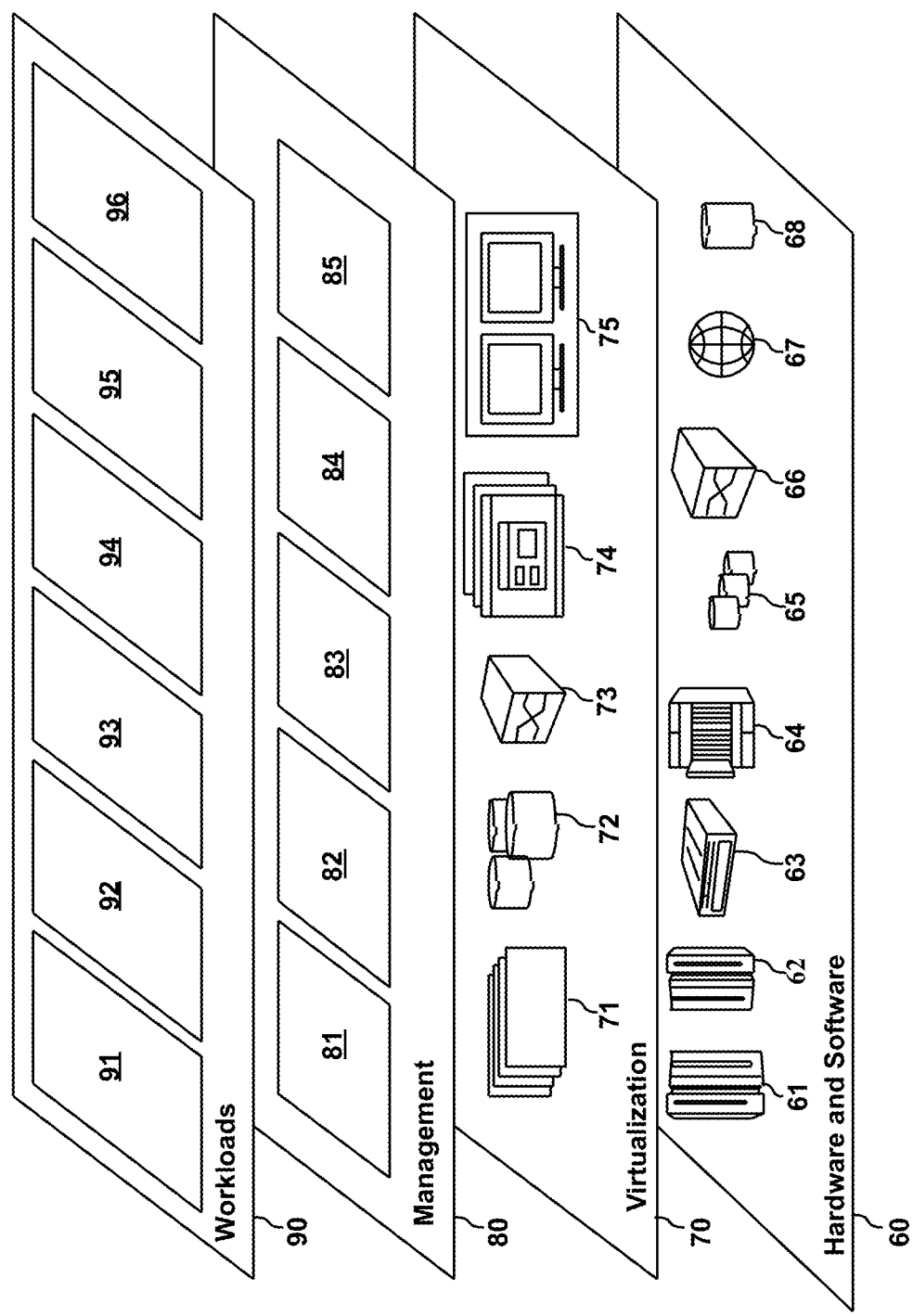
FIG. 5 is a block diagram of functional layers of the cloud computing environment of FIG. 4, according to an embodiment of the invention.

FIG. 5 is a block diagram of functional layers of the cloud computing environment of FIG. 4, according to an embodiment of the invention. Referring now to FIG. 5, a set of functional abstraction layers provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social media data analysis 96, including those described in connection with FIGS. 1, 2A, 2B, and 2C, above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing user access to data of a social media account, comprising:
   providing a first user with access to data of a social media account of a second user based on determining that a first data access request by the first user conforms to an expected data access pattern, based on analyzing any one or combination of:
      a historical data access pattern of the first user to data of the social media account of the second user; and
      a historical data access pattern of the first user to data of a social media account of a third user; and
      wherein the social media data comprises profile data and content data.

2. The method of claim 1, further comprising:
   denying the first user access to data of the social media account of the second user based on determining that a second data access request by the first user deviates from the expected data access pattern.

3. The method of claim 1, wherein an expected data pattern is defined based at least on relationship data of the first user with the second user.

4. The method of claim 1, wherein an expected data pattern is defined based on privacy settings of the social media account of the second user relative to a plurality of additional users.

5. The method of claim 1, wherein an expected data pattern is defined based at least on a length of time of past data accesses by the first user to data of the social media account of the second user.

6. The method of claim 1, wherein an expected data pattern is defined based at least on a frequency of past data accesses by the first user to data of the social media account of the second user.

7. The method of claim 1, wherein an expected data pattern is defined based at least on an access pattern for a third user to data of the social media account of the second user.

8. The method of claim 1, wherein an expected data pattern is defined based at least on an access pattern for the first user to data of a social media account of a third user.

9. The method of claim 1, wherein providing a first user with access to data of a social media account of a second user based on determining that a first data access request by the first user conforms to an expected data access pattern, comprises:
   limiting access by the first user to the data of the social media account of the second user for a period of time.

10. The method of claim 1, wherein providing a first user with access to data of a social media account of a second user based on determining that a first data access request by the first user conforms to an expected data access pattern, comprises:
    alerting the second user of the access request by the first user to the data of the social media account of the second user.

11. A computer system for managing user access to data of a social media account, comprising:
    one or more computer devices each having one or more processors and one or more tangible storage devices; and
    a program embodied on at least one of the one or more storage devices, the program having a plurality of program instructions for execution by the one or more processors, the program instructions comprising instructions for:
       providing a first user with access to data of a social media account of a second user based on determining that a first data access request by the first user conforms to an expected data access pattern, based on analyzing any one or combination of:
          a historical data access pattern of the first user to data of the social media account of the second user; and
          a historical data access pattern of the first user to data of a social media account of a third user; and
          wherein the social media data comprises profile data and content data.

12. The computer system of claim 11, wherein the programming instructions further comprise instructions for:
    denying the first user access to data of the social media account of the second user based on determining that a second data access request by the first user deviates from the expected data access pattern.

13. The computer system of claim 11, wherein an expected data pattern is defined based at least on relationship data of the first user with the second user.

14. The computer system of claim 11, wherein an expected data pattern is defined based at least on a length of time of past data accesses by the first user to data of the social media account of the second user.

15. The computer system of claim 11, wherein an expected data pattern is defined based at least on a frequency of past data accesses by the first user to data of the social media account of the second user.

16. A computer program product for managing user access to data of a social media account, the computer program product comprising a non-transitory tangible storage device having program code embodied therewith, the program code executable by a processor of a computer to perform a method, the method comprising:
    providing, by the processor, a first user with access to data of a social media account of a second user based on determining that a first data access request by the first user conforms to an expected data access pattern, based on analyzing any one or combination of:
       a historical data access pattern of the first user to data of the social media account of the second user; and
       a historical data access pattern of the first user to data of a social media account of a third user; and
       wherein the social media data comprises profile data and content data.

17. The computer program product of claim 16, wherein the method further comprises:
    denying the first user access to data of the social media account of the second user based on determining that a second data access request by the first user deviates from the expected data access pattern.

* * * * *